Patented Jan. 10, 1950

2,493,761

UNITED STATES PATENT OFFICE 2,493,761

CRACKING CATALYST AND CRACKING PROCESS UTILIZING THE SAME

Everett C. Hughes, Cleveland Heights, and Samuel M. Darling, Cleveland, Ohio, assignors to The Standard Oil Company, Cleveland, Ohio, a corporation of Ohio No Drawing. Application June 11, 1947, Serial No. 754,060

1 Claim. (Cl. 196—52)

This invention relates to processes for the catalytic treatment of higher hydrocarbons to produce lower hydrocarbons, such as those boiling in the motor fuel range, and more particularly to such processes wherein there is used as catalyst a group II metal fluoride supported on alumina, especially beryllium fluoride or magnesium fluoride or both. It also relates to the catalyst and methods of preparing the catalyst.

The catalytic cracking of gas oils and the like to produce gasoline is known, and various materials have been proposed as catalysts therefor. In a commercial operation, it is particularly desirable to obtain good conversion yields of the desired lower hydrocarbons in the cracking step, with a minimum amount of coke.

The objects achieved in accordance with the invention include the provision of cracking processes for cracking higher hydrocarbons to hydrocarbons boiling in the motor fuel range, with relatively low coke formation; the provision of cracking catalysts comprising a group II metal fluoride and alumina; and other objects which will be apparent as embodiments or details of the invention are set forth hereinafter.

In accordance with the invention, high molecular weight hydrocarbons are subjected to cracking conditions in the presence of a catalyst comprising alumina and a group II metal fluoride, especially beryllium fluoride or magnesium fluoride or both. The catalyst preferably contains from about 1 to about 20% by weight of the fluoride. The catalyst shows a high activity index and also a high conversion index, and the process gives good yields of products of the motor fuel boiling range, with desirably low coke formation.

The catalyst may be prepared by adding a slurry or solution of the group II metal fluoride to an aqueous slurry of alumina gel, then drying and grinding to the desired particle size. It may be activated by heating, such as to a temperature of about 1050° F. If desired the fluoride may be prepared in situ in an aqueous slurry of alumina gel.

In order to illustrate and point out some of the advantages of the invention, but in no sense as a limitation thereof, the following specific embodiments are included.

Example 1

(a) 2,808 grams of heavy alumina hydrate ($Al_2O_3.3H_2O$) and 2,025 grams of sodium hydroxide in 9 liters of water are mixed and heated to boiling, to form a solution of sodium aluminate. This is diluted with 30 liters of distilled water, and then alumina is precipitated by adding 1800 cc. of concentrated sulfuric acid (96%) which has been diluted with 3500 cc. of water. The final pH of the slurry is about 8. The gel is filtered, reslurried with water and filtered several times to wash out soluble sulfates.

(b) One-half of the above gel (a) is slurried with water, and then 484 grams of magnesium acetate ($Mg(O_2CCH_3)_2.4H_2O$) dissolved in 1 liter of water is added thereto. Magnesium fluoride is then precipitated in situ in the alumina slurry by the slow addition of 185 grams of 52% (weight) aqueous hydrofluoric acid. The mixed slurry is stirred for an hour and then filtered and washed. The filter cake is dried at 200° F. for 24 hours, crushed to a particle size of 4 to 14 mesh and heated at 1050° F. in a stream of dry air for 10 hours.

Example 2

(a) One-half of the alumina gel of Example 1 (a) is used in preparing the catalyst of this example.

(b) An aqueous slurry of the above half portion of the alumina gel is impregnated with a solution of beryllium fluoride. This solution is prepared by adding 432 grams of 52% aqueous hydrofluoric acid to an aqueous slurry of 242 grams of beryllium hydroxide in 1 liter of water. The alumina slurry containing the beryllium fluoride solution is stirred for 3 hours, allowed to stand 15 hours, and then filtered. The filter cake is dried 24 hours at 200° F. without further washing. It is then crushed and heat treated at 1050° F. as described in Example 1 (b).

The above catalysts were submitted to the so-called "Cat-A" catalyst activity test, which has been published and is known to the art. In this test, East Texas light gas oil is cracked for a 10 minute reaction period at 800° F., atmospheric pressure, and a space velocity of 1.5 v. v. h. The activity index of each was at least about 25, and the conversion index of each was at least about 32; and with the beryllium fluoride an activity index of as high as 37 and a conversion index of as high as 60 has been obtained.

Portions of these catalysts were crushed to 40 to 100 mesh and then tested in a fluidized-fixed bed cracking apparatus, in the cracking of a light pipe-still gas oil of 34° A. P. I. gravity, at atmospheric pressure, a feed rate of about 0.95 v. v. h., and at the temperatures indicated below. Similar tests were run with a commercial silica-alumina type catalyst referred to as "Catalyst X," and another commercial silica alumina catalyst referred to as "Catalyst Y." The following results are typical of the conversions obtained, indicated as a weight ratio of liquid hexane to 410° F. boiling point material relative to coke.

Table I

| Catalyst | Ratio: Liquid Hexane to 410° F. B. P. Coke | | |
|---|---|---|---|
| | 850° F. | 900° F. | 950° F. |
| Example 1 (b) | 22 | 11 | .7 |
| Example 2 (b) | 13 | 11 | 9 |
| Catalyst X | 7 | 6.5 | 5.8 |
| Catalyst Y | 5.4 | | 4 |

In each test, good conversion of the charge was obtained. However, as indicated by the above data, catalysts of the invention are markedly superior in that the ratio of desirable material (liquid hexane at 410° F. B. P.) to undesirable material (coke) is far greater. This is particularly noticeable in the 850° F. test wherein the Example 1 (b) catalyst shows an approximately 4-fold improvement over the commercial catalyst "Y."

The catalyst compositions may be used for cracking kerosene, gas oil, reduced crudes, or the like, at usual cracking temperature such as in the range of from 750° F. to 1050° F., at suitable feed rates such as 0.1 to 10 v. v. h., and suitable pressures such as in the range of atmospheric to 10 atmospheres, to give the desired conversion of the charge. They may be used as catalysts for naphtha reforming. The catalysts may be used under catalytic cracking conditions in either powder, lump or pellet form in fluid, moving or fixed bed type operations.

The group II fluoride catalysts of the invention are distinctly superior to group III fluoride catalysts, such as aluminum fluoride, as to stability. This can be shown in an accelerated aging test, wherein the catalytic material is heated for 2 hours at 1100° F. in nitrogen, and then heated at 1100° F. in the presence of steam. Aluminum fluoride lost 39% of its original fluorine content after an 0.5 hour steam treatment. However, magnesium fluoride lost only 0.27% of its original fluorine after a 5.5 hour steam treatment. This difference is especially significant since oftentimes steam is present during the operating cycle. The other group II metal fluorides, such as beryllium fluoride, are of comparable stability.

The fluorides are to be distinguished from the corresponding chlorides. For instance, magnesium fluoride is not soluble in water, whereas magnesium chloride is soluble in water.

The combinations of the group II metal fluorides with alumina are to be distinguished from similar materials used with other supports, such as aluminum phosphate or silica. To show this corresponding catalysts containing 20% by weight of magnesium fluoride were prepared, using the different supports, and then heated at 900° F. for 1 hour under vacuum. One portion of each catalyst was treated at 1050° F. for 18 hours in the presence of dry air; and a second portion of each was treated at 1250° F. for 10 hours in the presence of steam. Their activity was then determined in accordance with the above described "Cat-A" test. The following results are typical:

Table II

| Catalyst Support | Percent Gasoline | |
|---|---|---|
| | Dry Air Treated Catalyst | Steam Treated Catalyst |
| Alumina | 38.6 | 26.5 |
| Aluminum phosphate | 33.9 | 4.6 |
| Silica | 19.0 | 11.3 |

As already indicated, the steam treatment is an accelerated aging test. It is apparent from the above data that the alumina supported catalyst, of the invention, is distinctly superior to the phosphate or silica supported catalysts, as to activity after treatment with dry air. It is also distinctly superior to the other catalysts, after the steam treatment. As to the latter, it shows an about 5-fold superiority over the corresponding aluminum phosphate supported catalyst.

Variations and modifications may be apparent to one skilled in the art in view of the foregoing disclosures and it is intended to claim the invention broadly, including all variations and modifications except as do not come within the scope of the appended claim.

We claim:

A method of converting higher boiling hydrocarbon to lower boiling products which comprises subjecting said hydrocarbon to cracking conditions of temperature and pressure in the presence of a silica-free catalyst comprising alumina and from 1% to 20% by weight of beryllium fluoride.

EVERETT C. HUGHES.
SAMUEL M. DARLING.

REFERENCES CITED

The following references are of record in the file of this patent:

UNITED STATES PATENTS

| Number | Name | Date |
|---|---|---|
| 2,289,375 | Mattox | July 14, 1942 |
| 2,301,913 | Veltman | Nov. 17, 1942 |
| 2,348,702 | Schmerling et al. | May 9, 1944 |
| 2,388,937 | Schmerling et al. | Nov. 13, 1945 |
| 2,399,781 | Arnold | May 7, 1946 |
| 2,407,052 | Bailey et al. | Sept. 3, 1946 |
| 2,425,463 | Garrison | Aug. 12, 1947 |